United States Patent [19]
Moc et al.

[11] Patent Number: 5,320,681
[45] Date of Patent: Jun. 14, 1994

[54] METHOD OF PRODUCING SUGAR WITH RECLAIMING AND RECYCLING OF CARBONATION SCUM

[75] Inventors: Dalibor Moc; Jaroslav Zaruba, both of Hradec Králové, Czechoslovakia

[73] Assignee: Limex, Hradec Králové, Czechoslovakia

[21] Appl. No.: 847,591

[22] Filed: Mar. 5, 1992

[51] Int. Cl.$^5$ ............................................. C13D 3/00
[52] U.S. Cl. ................................... 127/46.1; 127/48; 127/53
[58] Field of Search .................. 127/46.1, 48, 53, 50, 127/52

[56] References Cited

U.S. PATENT DOCUMENTS

| | | | |
|---|---|---|---|
| 1,755,165 | 4/1930 | Bull | 127/50 |
| 1,941,461 | 1/1934 | Bull et al. | 127/50 |
| 2,164,186 | 6/1939 | Brown et al. | 127/50 |
| 3,133,044 | 12/1963 | Alston | 127/48 |
| 3,734,773 | 5/1973 | Haley | 127/48 |
| 3,834,941 | 9/1974 | Schoenrock et al. | 127/52 |
| 4,321,239 | 3/1982 | Bildjukevich et al. | 423/175 |
| 4,424,078 | 1/1984 | Schiweck et al. | 127/50 |
| 4,580,732 | 4/1986 | Manteil | 241/30 |
| 4,795,494 | 1/1989 | Toth et al. | 127/48 |

*Primary Examiner*—R. Bruce Breneman
*Assistant Examiner*—Patricia L. Hailey
*Attorney, Agent, or Firm*—Notaro & Michalos

[57] ABSTRACT

A method of producing sugar through the recycling of a carbonation scum produced after a first carbonation of a sugar juice treated with a lime milk comprises separating the scum after the first carbonation. The scum-free sugar juice is then filtered for producing sugar. An amount of the separated scum is diluted with water. After diluting, the pH of the diluted scum is adjusted, and a thick portion of the amount of the scum is separated and activated. The activated thick portion of the scum is then recycled for introduction with a sugar juice.

3 Claims, 3 Drawing Sheets

METHOD OF PRODUCING SUGAR WITH RECLAIMING AND RECYCLING OF CARBONATION SCUM

FIELD AND BACKGROUND OF THE INVENTION

The invention relates to a method of producing sugar through the claiming and recycling of carbonation scum for sugar factories by utilizing the scum produced from a first carbonation.

In known processes for sugar juice clarification, calcium hydroxide ($Ca(OH)_2$) in lime milk form has been used in combination with carbonation gas, i.e. carbon dioxide ($CO_2$). One essential chemical reaction accompanying the first sugar juice carbonation for these known processes, is that secondary unsoluble calcium carbonate ($CaCO_3$) is formed on the surface of the juice along with other chemical substances such as nonsugar substances in a solution form. The lime milk and carbon dioxide are manufactured in the sugar factories by burning limestone ($CaCO_3$) which decomposes into calcium oxide ($CaO$) and carbon dioxide ($CO_2$). After having been used for the sugar juice clarification, the $CaO$ and $CO_2$ are again subjected to a chemical reaction in order to produce calcium carbonate ($CaCO_3$). This reaction is well-known in the sugar industry.

In the plants, the produced calcium carbonate ($CaC_3$), also known as carbonation scum or sludge, is separated from the process by filtering and decanting in order to improve the filtering properties of the carbonated juice. Calcium carbonate ($CaCO_3$) generated in the first carbonation is a nonsugar substance and is removed from the line.

These known sugar processes are considerably expensive due to the relatively high consumption of raw materials necessary for the manufacture of the burnt lime, lime milk and carbonation scum. These processes negatively influence both the economy and the environment.

SUMMARY OF THE INVENTION

The drawbacks of the prior art are substantially reduced by applying a method of producing sugar with reclaiming and recycling carbonation scum according to the present invention. In order to purify a sugar juice at a purification station for producing sugar, carbonated calcium is provided to the sugar juice constituting a first carbonation which results in carbonation scum. The present invention recycles the carbonation scum, after the first carbonation of the sugar juice. The present invention allows for from zero to 100% of the carbonation scum to be separated by a sugar juice filtration wherein the scum is diluted by process water to a density of from 1010 to 1350 kg/cu.m. The diluted carbonation sludge is then buffered to a pH value of from 6.00 to 11.20 activated by calcium and by hydroxide. After the concentration of the scum with the water, the scum is activated by calcium oxide or calcium hydroxide, if necessary, in any ratio for being recirculated back to the purification station.

The present invention provides for a considerable decrease in the expenses necessary for procuring raw materials for carbonation scum, such as burnt lime, lime milk and carbonation gas. An advantage of the present invention is that there is a reduction in the entire volume of carbonation scum needed which benefits the environment.

The process according to the present invention utilizes the carbonation scum produced after the first carbonation of the sugar juice. In succession, the scum is separated, adjusted according to a pH value, freed from adsorbed nonsugar substances, activated by calcium oxide or calcium hydroxide and recycled back to a purification station. In order to regenerate the scum, from zero to 100% of the scum is separated by filtering after the first carbonation. The scum is then diluted to a density of from 1010 to 1350 kg/cu.m. The pH value of the scum is adjusted to 6.0–11.2, depending on the nonsugar substance quality. The separated regenerated scum can be activated with lime milk prior to recirculation back to the purification station.

DESCRIPTION OF THE PREFERRED EMBODIMENT

The method according to the present invention is utilized after a first carbonation of a sugar juice is undertaken by adding a lime ($CaO$) for purifying the juice. The lime is removed by carbonating the mixture which forms calcium carbonate ($CaCO_3$). The present invention comprises removing the calcium carbonate from the first carbonate juice by filtering off the calcium carbonate, also known as carbonation scum, by washing with water.

Figure 1:
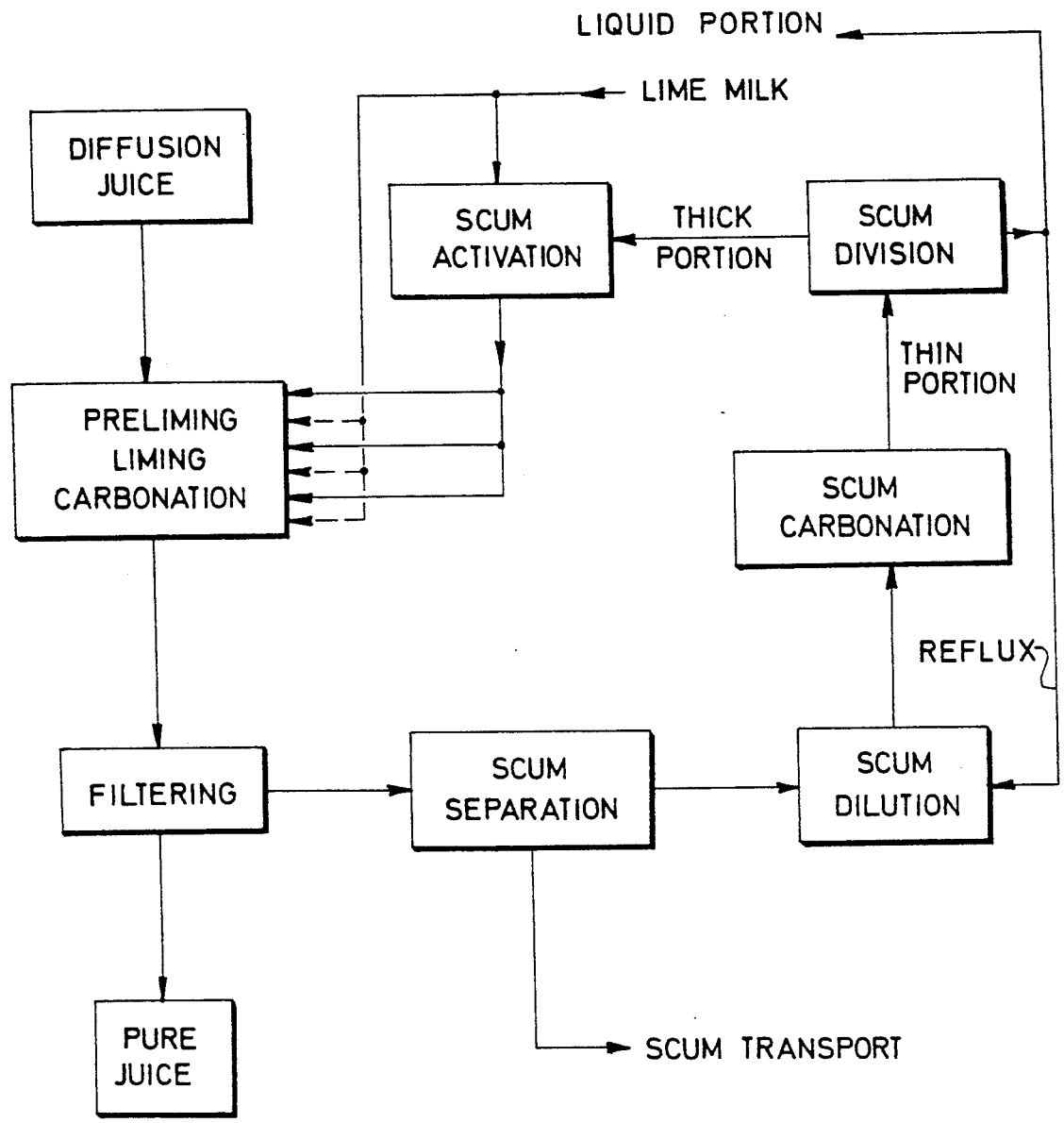
FIG. 1 is a block diagram of a method for purifying sugar juice according to the present invention.
Figure 2:
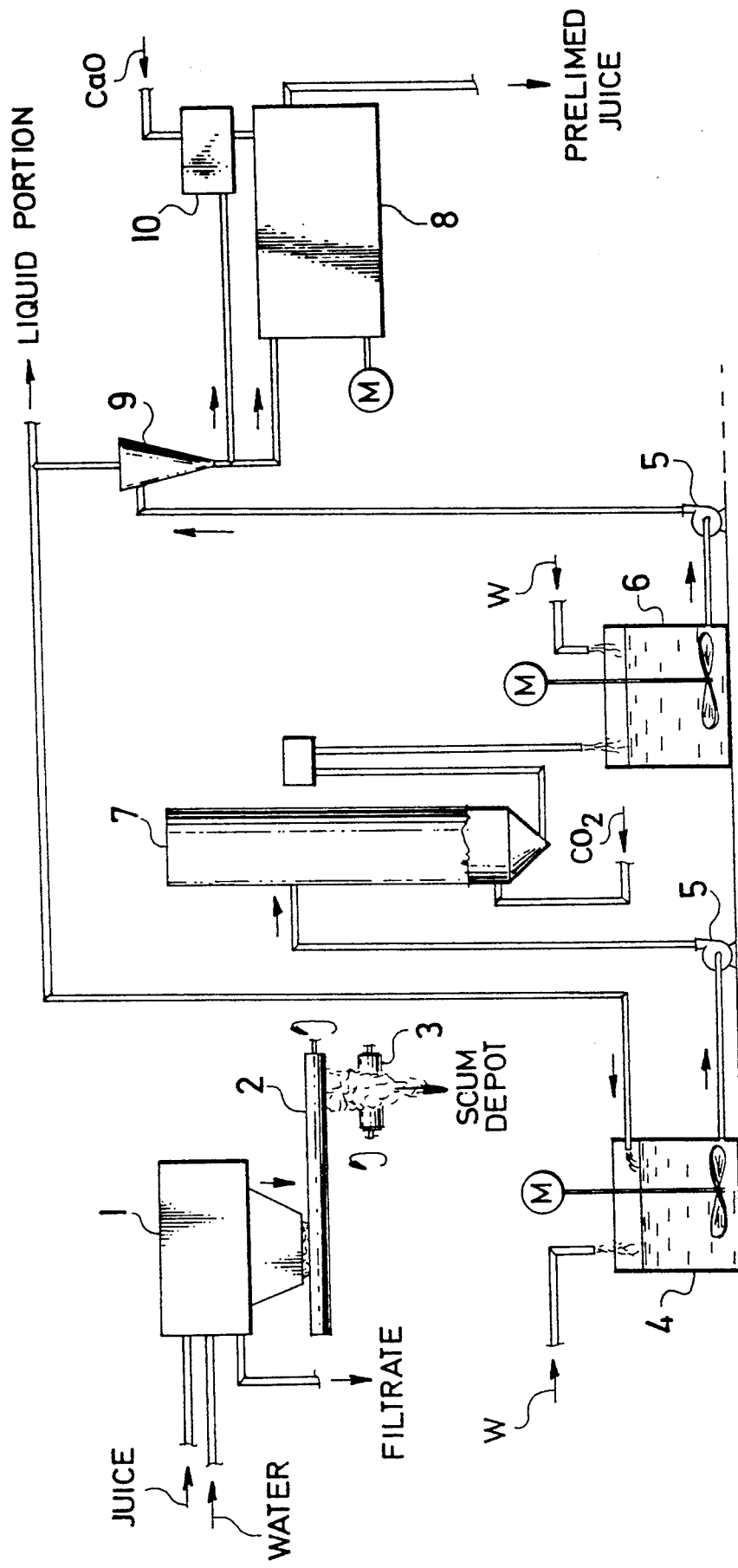
FIG. 2 is a schematic flow diagram of one-stage process of the method of FIG. 1.
Figure 3:
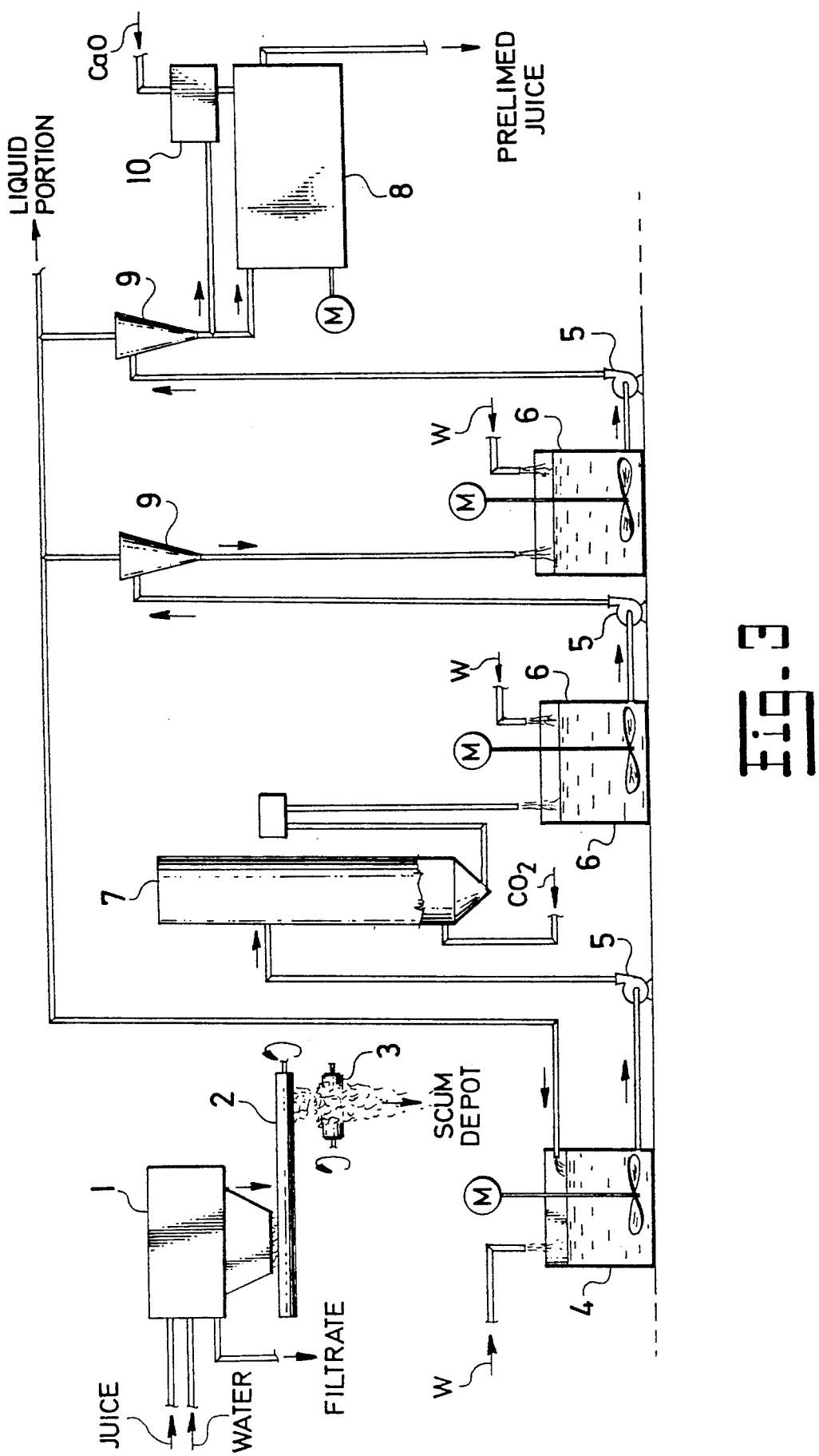
FIG. 3 is a schematic flow diagram of a two-stage process of the method of FIG. 1.

FIGS. 2 and 3 illustrate that a filter press station 1 receives the sugar juice after the first carbonation and water for separating and washing the carbonated scum. Filtrate or pure sugar juice is separated from the filter press station 1. Carbonation scum is withdrawn from the process at station 1 by conveyors 2 and 3 and deposited in a scum depot.

A portion of the carbonation scum which can comprise from zero to 100% of the original total amount at filter station 1 is separated and diluted in a mixer 4 with water for achieving a density of from 1010 to 1350 kg/m$^3$.

The carbonation scum solution is pumped from mixer 4 by centrifuge pump 5 and is adjusted in a device such as a carbonator 7 having a kiln gas distributor for adjusting the pH value of the scum to a pH value of from 6.00 to 11.20.

Carbonator 7 uses $CO_2$ for producing chemical reactions with the scum for adjusting the pH of the scum. The pH adjusted scum is stored in a storage tank 6. The chemically treated solution of carbonation scum from tank 6 is pumped by pump 7 to be divided into portions and thickened by hydrocyclone separator 9. A thin liquid portion is recirculated to a preliming carbonation tank 8. The thin liquid portion of can comprise from zero to 100% of the activated scum divided by hydrocyclones 9. A thick portion of the activated scum is sent from the cyclone separator 9 and is activated in a reactor 10 by means of lime milk ($CaO$).

FIG. 3 shows that a plurality of storage tanks 6 for pH adjusted scum, hydrocyclones 9, and centrifugal pumps 5 can be used in series prior to recirculation to preliming tank 8 and reactor 10.

The activated mixture is conveyed from reactor 10, where it is mixed with lime milk, to prelimer 8. The ratio between the supplied lime milk amount and the mixture varies.

The invention is applicable in the manufacture of sugar, and particularly in the field of sugar juice clarification. The present invention enables considerable economy in both manufacturing and expenses to be achieved. Thus, the present invention makes it possible to extend the manufacturing capacities of sugar factories.

We claim:

1. A method of producing sugar through a recycling of carbonation scum produced after a first carbonation of a sugar juice treated with a lime milk, the method comprising:

separating the scum after the first carbonation of the lime-treated sugar juice;

filtering a scum-free sugar juice for producing sugar;

diluting an amount of the separated scum with water to a density ranging form 1010 to 1350 kg/m$^3$;

adjusting the pH of the diluted scum to a pH value ranging from 6.00 to 11.20 by mixing the diluted scum with carbon dioxide ($CO_2$);

after adjusting the pH, separating a thick portion from the diluted scum;

activating the thick portion of the scum; and recycling the activated thick portion of the scum for introduction with a sugar juice.

2. The method according to claim 1, wherein the thick portion of the scum is activated with calcium oxide (CaO).

3. The method according to claim 1, wherein the thick portion of the scum is activated with calcium hydroxide (Ca(OH)$_2$).

* * * * *